Nov. 11, 1958  E. J. STRAMOWSKI  2,860,205
REPEATING CIRCUIT INTERRUPTERS

Filed March 26, 1957  3 Sheets-Sheet 1

INVENTOR.
EDMUND J. STRAMOWSKI
BY
ATTORNEY

Nov. 11, 1958   E. J. STRAMOWSKI   2,860,205
REPEATING CIRCUIT INTERRUPTERS
Filed March 26, 1957   3 Sheets-Sheet 2
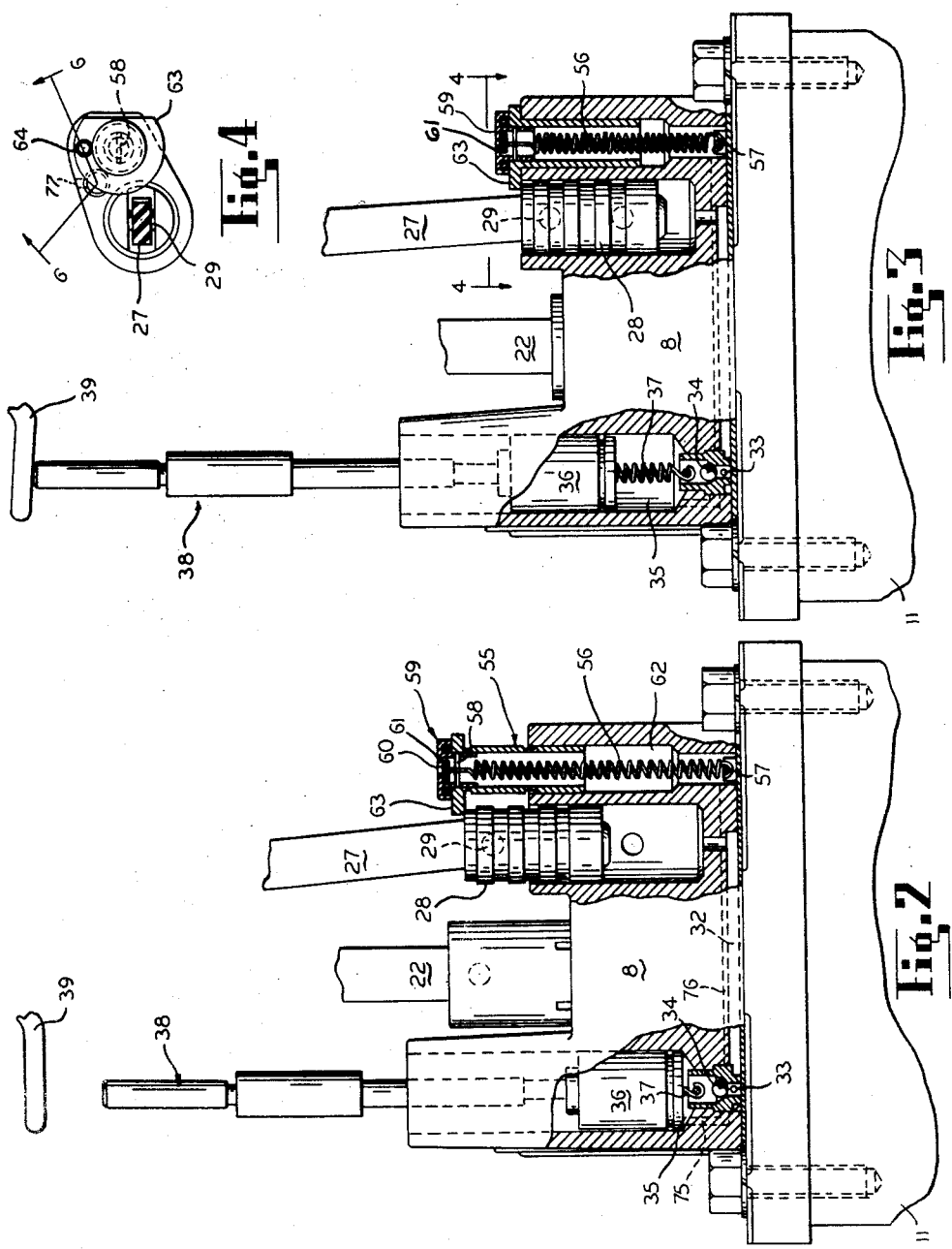
INVENTOR.
EDMUND J. STRAMOWSKI
BY
Ralph G. Hohenfeldt
ATTORNEY Nov. 11, 1958   E. J. STRAMOWSKI   2,860,205
REPEATING CIRCUIT INTERRUPTERS
Filed March 26, 1957   3 Sheets-Sheet 3

INVENTOR.
EDMUND J. STRAMOWSKI
BY
*Ralph G. Hohenfeldt*
ATTORNEY

United States Patent Office 2,860,205
Patented Nov. 11, 1958

2,860,205

REPEATING CIRCUIT INTERRUPTERS

Edmund J. Stramowski, Milwaukee, Wis., assignor to McGraw-Edison Company, Milwaukee, Wis., a corporation of Delaware Application March 26, 1957, Serial No. 648,530

7 Claims. (Cl. 200—89)

This invention pertains generally to repeating circuit interrupters and more particularly to improvements in the operation integrating mechanism thereof.

Circuit interrupters of the class popularly designated as reclosers are now frequently installed in power lines emanating from distribution centers such as substations in addition to their more conventional installation in distribution lines more remote from a power source. In any case the recloser responds to transient faults by opening and reclosing successively and finally returning to a closed circuit condition if the fault clears. If the fault is permanent and a predetermined number of such opening and closing operations are successively carried out and integrated, there is provided integrating means adapted to render a lockout means effective and thereby cause the recloser to be restrained in open circuit condition until reset by manual means or by remotely controlled automatic means such as a relay.

In important substation applications, it is often desirable for the operation integrating means of the recloser to be quickly returned to its original condition so that automatic lockout will not recur prematurely if, following manual or automatic resetting, the recloser again operates in response to either a temporary fault or to transient surges incident to re-energizing an electrical load after an outage.

A common form of integrating device is one involving a hydraulically supported integrating or trip piston that is disposed in a cylinder and adapted to be advanced in a step-by-step manner during occurrence of a fault for ultimately striking a latch that releases lockout mechanism which holds the interrupter switch open until the same is reset. The integrating piston may be advanced in steps by mechanical means, such as where the piston is provided with a toothed rack that is engaged by a pawl mechanically driven by the interrupter switch operating mechanism or, in another case, the piston may be advanced by a hydraulic pump that takes one stroke for each interrupter operation and thereby forces charges of fluid into the integrating device until it advances to lockout mechanism actuating position.

If the fault is temporary, the integrating means advances only to an intermediate position and then it slowly resettles to its original position. If the fault is permanent, and lockout occurs, it is desirable for reasons stated earlier that the integrating means return to its original position with great rapidity so that the recloser may execute its full sequence of operations immediately following manual or automatic resetting of the interrupter switch.

Accordingly, it is an object of this invention to provide means for quickly restoring the integrating means of a locked out circuit interrupter to a condition where the integrating means may again carry out its full operational sequence prior to recurrence of lockout.

Collateral to the aforegoing object, it is a further object to arrange the integrating means and restoration means so that the latter does not affect integration in instances where the fault is only temporary and lockout does not occur.

A more specific object is the provision of a circuit interrupter that has an integrating means involving the use of fluid or liquid for elevating a piston, bellows, diaphragm or the like, and that includes a relief valve which may be actuated at an appropriate time for discharging the fluid and, in effect, cancelling the cumulative result of previously integrated interrupter operations.

A general object of the invention is the provision of an improved circuit interrupter and more specific objects will appear periodically throughout the course of the ensuing specification.

Reference is invited to the following non-exclusive list of U. S. patents and applications for examples of reclosers that may be improved by the present invention and for filling in details that are not necessary to understanding the present invention: No. 2,560,831 to A. Van Ryan et al., dated July 17, 1951; No. 2,710,895 to R. S. Frederickson, dated June 14, 1955; copending application, Serial No. 640,167, filed February 14, 1957, by H. Date et al.; and, the copending application of Van Ryan et al., Serial No. 382,365, filed September 25, 1953, now Patent No. 2,810,038, dated October 15, 1957, for a polyphase circuit interrupter, all of which patents and applications are assigned to the instant assignee or its predecessor.

Generally stated the present discussion concerns itself with a repeating circuit interrupter or recloser that includes switch means and a solenoid coil adapted to effect switch operation upon occurrence of an overload. Lockout means are provided for rendering the switch operating means ineffective to open or close the switch means following a predetermined number of closely successive switch operations. In the interrupter chosen for illustrating the invention, a hydraulic pump is driven by the switch operating means and each stroke of the pump delivers a measured quantity of fluid to a cumulative cylinder in which there is an integrating piston. The integrating piston is adapted to be advanced in accordance with each stroke of the pump until the piston ultimately operates lockout means that prevent further reclosing until action has been taken to manually or automatically reset the operating mechanism.

In order to assure quick resetting of the integrating means in accordance with terms of the invention, a relief valve is provided for controlling the fluid under the integrating piston. The relief valve is adapted to remain closed during a sequence of switch operations that does not terminate in lockout and to open and thereby quickly restore the integrating means to its normal condition in the event of a permanent fault and lockout. The relief valve is in turn actuated by a time delayed auxiliary piston that is controlled by the pump.

A more detailed explanation of the invention will now be set forth in connection with the following drawings in which:

Fig. 2 is an elevational view, partly in section, and with parts broken away, of the operating mechanism of the circuit interrupter shown in Fig. 1;

Fig. 3 is similar to Fig. 2 except that the same parts of the interrupter are shown in a position corresponding with lockout of the interrupter;

Fig. 4 is a top view taken on the line 4—4 of Fig. 3;

Figure 1:
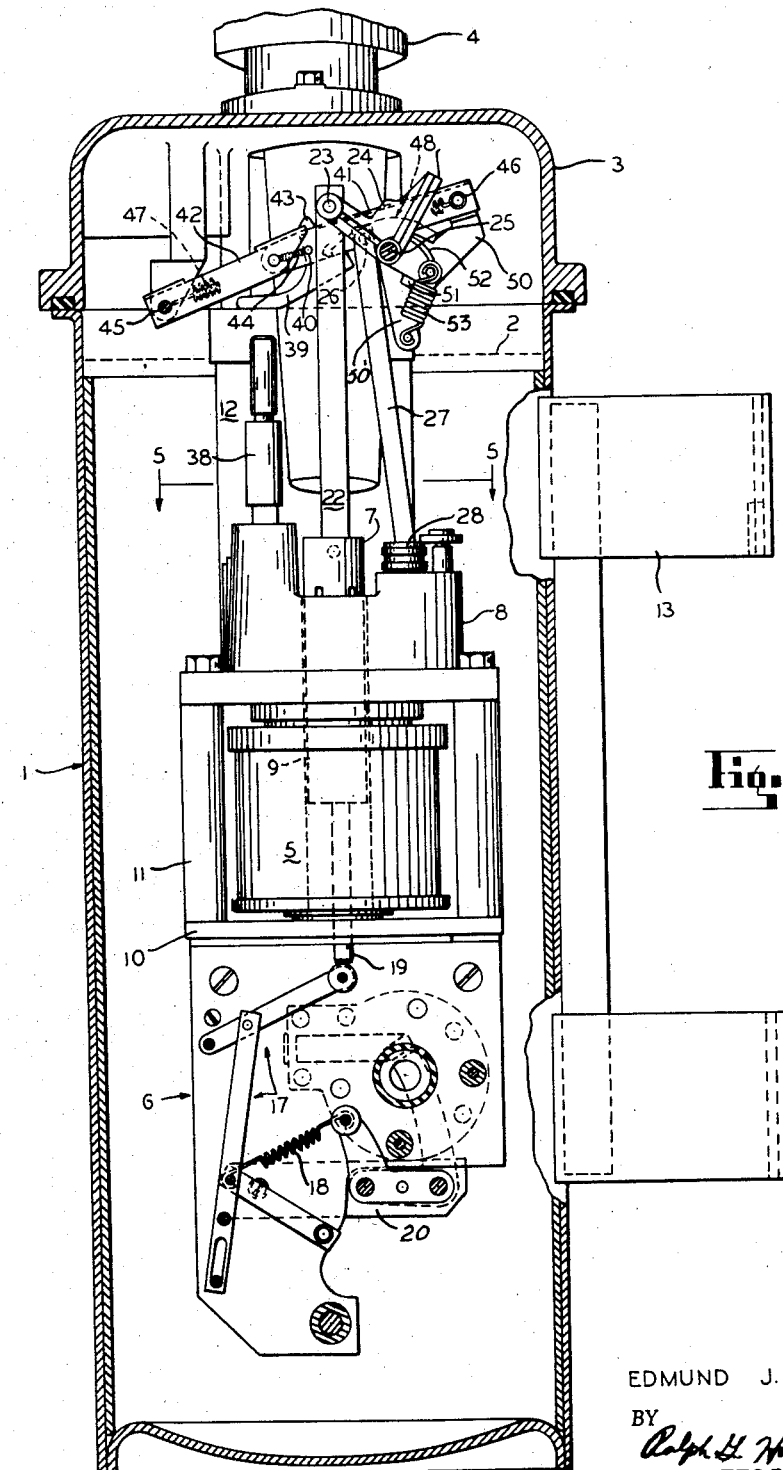
Fig. 1 is a sectional elevational view of a circuit interrupter embodying the invention.

Before proceeding with a detailed discussion of the invention, the general features of a typical circuit interrupter to which the invention may be applied will be outlined. As seen in Fig. 1 the interrupter comprises a metal tank 1 filled with dielectric oil to the level indicated by the broken line 2 and provided with a metal cover 3 gasketed to the tank. The tank has welded-on brackets 13 for attaching it to any suitable mounting structure. The interrupter chosen for illustrative purposes is of the series type and includes a pair of porcelain bushings 4, one of which is shown. The bushings project interiorly of the tank beneath the level of the oil and serve as a conduit for incoming and outgoing line leads, not shown. The line leads are serially connected in a well known manner with an electromagnetic operating coil 5 which is in turn connected in series with an interrupter switch assembly indicated generally by the reference numeral 6. During normal operation, coil 5 is traversed by less than minimum trip current but if fault current flows therethrough, increased magnetization of the coil causes downward attraction of an electromagnetic plunger 7 whose descent opens the interrupter switch 6 and de-energizes coil 5. Plunger 7 extends through a head casting 8, and further, partially through the cylindrical interior 9 of coil 5. Since the entire structure is immersed in fluid, plunger 7 undergoes a dashpot action while descending.

Magnet coil 5 is completely surrounded by a magnetic path including head casting 8, a perforated base plate 10 and spacer posts 11. The interrupter switch 6 may be fastened to base plate 10 by any suitable bolt means, not shown. All of the mechanism within tank 1 is supported from cover 3 on insulating rods or stringers 12.

Interrupter switch 6 comprises overcenter linkage generally designated by the numeral 17 and includes a spring 18 which is loaded to a dead center position upon descent of plunger 7, whereupon a movable contact arm 20 is rocked clockwise with a snap action and the switch opens. Following opening of the switch 6, coil 5 is de-energized and spring 18 then forces plunger 7 upward to its Fig. 1 position, whereupon the interrupter becomes conductive again. Mutual interaction between plunger 7 and linkage 17 is effected through a rod 19 extending from the bottom of the plunger 7 through base plate 10. The switch 6 here under consideration is discussed in detail in the cited copending Date et al. application. The switch and magnetic responsive elements may also take the form of those illustrated in the cited Van Ryan et al. application.

Present interests merely require an understanding that the switch 6 opens when plunger 7 descends during flow of minimum trip current and that the plunger is forced upwardly and the switch is closed, after current flow ceases, due to the influence of spring 18.

The commercial form of this type of interrupter is provided with mechanism for bringing about a dual time-current characteristic, but this structure has been omitted from the instant disclosure in the interest of brevity and because it is well known.

Plunger 7 is supported on an insulating link 22 which is pivotally connected by means of a pin 23 to a double armed lever 24. Lever 24 is loosely journalled on a main shaft 25 which extends laterally through cover 3 where it carries an external manual operating handle or other shaft positioning resetting means, not shown. Also pivotally connected to arm 24 at 26 is an insulating link 27 which extends downwardly to a pump piston 28. Link 27 is operatively joined to pump piston 28 by means of a pin 29. It will be obvious upon referring to Fig. 1 that pump piston 28 descends or takes a stroke each time magnetic plunger 7 executes a like movement.

As implied above, each time plunger 7 descends to effect opening of the switch means 6, pump piston 28 displaces a definite quantity of fluid. The displaced fluid is forced through a duct 32 through a hole 33 under a gravity and pressure biased ball valve 34, whereupon it flows into a cumulative cylinder 35. Ball valve 34 permits admission of fluid into cylinder 35 but prevents fluid outflow.

Within cumulative cylinder 35 there is an integrating piston 36 which is caused to advance upwardly in a step-by-step manner in correspondence with switch operations and strokes of pump 28. If a temporary fault occurs and disappears, integrating piston 36 is advanced upwardly to an intermediate position whereupon it resettles to its original position, see Fig. 2, under the influence of gravity and a return spring 37. If the fault is permanent, however, integrating piston 36 is elevated to a maximum predetermined height, see Fig. 3, after which lockout of the switch means 6 will occur due to the presence of lockout mechanism to be described soon.

In order that shaft 25 shall not rotate clockwise unintentionally as viewed in Fig. 1 and thereby allow an external operating handle (not shown) carried on shaft 25 to swing down and falsely indicate that the interrupter is open, short lever 52, which is fixed on shaft 25, is restrained by means of a coil spring 53 against stop 51 projecting from arm 50' of rocking lever 50.

Integrating piston 36 has attached to it an insulating stem 38 that is telescopically adjustable in length for the purpose of facilitating selection of the total number of interrupter operations desired prior to lockout. Lockout occurs when stem 38 strikes a trip latch finger 39. Latch finger 39 is carried on a pin 40 supported on a channeled section toggle link 41 that nests within another channeled toggle link 42. A small hook 43 on latch 39 overhangs toggle link 42 and is biased toward the same by a latch spring 44, thus effecting rigid interengagement between links 41 and 42 under normal conditions. Link 42 is carried on a fixed pivot 45 and remotely therefrom opposite link 41 is carried on a movable laterally extending pivot pin 46.

Stretched across the toggle links 41 and 42 between fixed pivot 45 and movable pivot 46 is a lockout spring 47 which has a tendency to break toggle links 41 and 42 upwardly, but such action is normally prohibited by latch 39 tending to maintain the toggle links rigid with respect to each other.

Laterally extending pivot pin 46 serves to join toggle link 41 to a rocking lever 50 which is loosely journalled on main shaft 25. Lever 50 is provided with a projection 51 that extends into the path of a short lever 52. Short lever 52 is rigidly affixed to main shaft 25 so that when the latter is rotated by an external operating handle, for example, lever 50 is driven to its toggle set position of Fig. 1 by the short lever 52 striking projection 51.

When the interrupter operates to lockout after hooked end 43 is unlatched, toggle links 41 and 42 break upwardly and movable pin 46 moves counterclockwise until double armed lever 24 is struck and likewise driven in a counterclockwise direction. This causes plunger 7 and pump piston 28 to move downwardly and come to rest as illustrated in Fig. 3. Descent of plunger 7 will cause movable contact arm 20 of the switch assembly 6 to swing in a clockwise direction and permanently open the series interrupter circuit until it is restored by manual resetting of the lockout toggle link assembly by means of rotating shaft 25 clockwise until short lever 52 resumes the position in which it is viewed in Fig. 1. Latch 39 can also be released manually by rotating shaft 25 counterclockwise, see Fig. 1, until short lever 52 strikes a bow-shaped lever 48 which bears on the latch and causes it to rotate for releasing its hooked end 43.

Thus far the description of the interrupter pertains to features which are well established in the prior art. The description will proceed with a detailed discussion of novel structure for facilitating the quick return of the integrating piston 36 from its Fig. 3 position where it is shown at the time of lockout, to its Fig. 2 or original position.

Immediately adjacent pump piston 28 there is an auxiliary piston 55 under which there is normally a quantity of hydraulic fluid that prevents descent of the auxiliary piston, see Fig. 2. Auxiliary piston 55 is adapted to be normally restrained in its uppermost Fig. 2 position by the pump piston 28 although piston 55 tends to settle downwardly under the influence of a spring 56. Spring 56 is anchored on a pin 57 near the bottom of head casting 8 and is attached to the auxiliary piston by means of a crosspin 58. A cap 59 substantially closes the upper end of piston 55 except for the presence of a small orifice 60. When the auxiliary piston 55 descends, orifice 60 is closed by a loosely confined disc valve 61 which is forced upwardly against orifice 60 by hydraulic pressure in auxiliary piston cylinder 62. In the instant embodiment there is no opportunity for fluid to be freely discharged from cylinder 62 while piston 55 is descending. Consequently, the auxiliary piston 55 settling rate is controlled by the tension in spring 56 and a small amount of leakage about the periphery of the piston.

Auxiliary piston 55 is provided with a flange portion 63 which overhangs and extends into the path of pump piston 28. Flange 63 is apertured for sliding on a fixed guide pin 64. When the pump piston 28 is in its uppermost position as in Fig. 2 the auxiliary piston 55 is likewise held in its uppermost position. However, when the pump piston strokes during interrupting operations of the switch, the downward velocity of the pump piston is much greater than the settling rate of the auxiliary piston 55 and, accordingly, the auxiliary piston does not have time to settle to its lowermost position, shown in Fig. 3, except after interrupter switch lockout when pump piston 28 comes to rest in its corresponding lowermost position for an appreciable period of time.

During interrupter operations preceding lockout, pump piston 28 reciprocates at a rapid rate while performing its integrating function and auxiliary piston 55 tends to follow it. Each time pump piston 28 returns to its uppermost position it likewise restores auxiliary piston 55 to its uppermost position so that the time delay or settling time of piston 55 following lockout is substantially the same under all circumstances.

Auxiliary piston 55 controls the fluid in cumulative cylinder 35 through acting on a relief valve mechanism including a valve stem 66 which is also overhung by the flange 63 of the auxiliary piston and located behind the latter, see Figs. 4–7. Valve stem 66 is surrounded by a coil spring 67 disposed in a counterbored hole 68 projecting vertically through the head casting 8. Spring 67 tends to lift valve stem 66 upwardly so that the latter will remain in contact with the overhanging flange 63 of the auxiliary piston 55. The valve stem 66 terminates at its lower end in a diametrically restricted portion 70 that extends through the valve stem bore 69. Restricted end 70 bears against a thin valve disc 71 that is biased toward seating against smooth surface 72 by a small compression spring 73.

Figure 5:
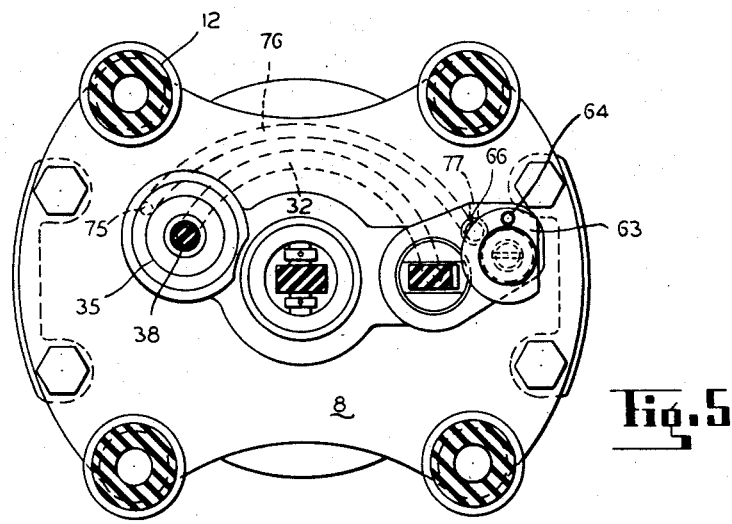
Fig. 5 is a plan view of the interrupter operating mechanism taken on the line 5—5 of Fig. 1.

Cumulative cylinder 35 has a hole 75 in its bottom which joins an arcuate fluid duct 76 that in turn terminates in the region of the valve seat 72. When the disc valve 71 is depressed by valve stem 66 as in Fig. 6, fluid may freely discharge from the cumulative cylinder 35 through duct 76, above valve disc 71 and through a discharge hole 77. In Fig. 5 is may be seen that relief duct 76 is concentric with pump discharge duct 32 but the ducts are not interconnected.

Figures 6, 7:
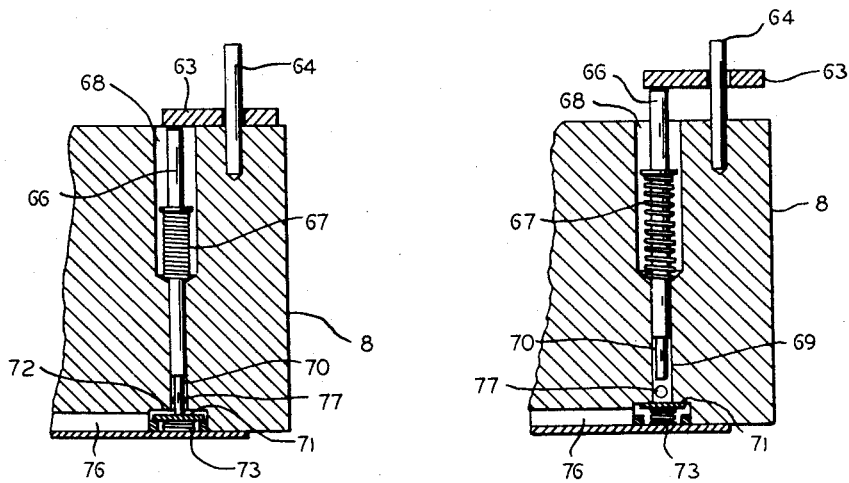
Fig. 6 is a partial sectional view taken on the line 6—6 of Fig. 4 with the parts positioned in correspondence with lockout of the interrupter as illustrated in Fig. 3; and, Fig. 7 is a partial sectional view similar to Fig. 6 but showing the same parts as they are positioned shortly after lockout of the interrupter.

Fig. 7 illustrates conditions prevailing during the time following lockout in which auxiliary piston 55 is settling and before relief valve disc 71 has been unseated. Note here that the bias of compression spring 67 maintains valve stem 66 in a position separate from the disc 71 and thus prevents outflow of the fluid that supports integrating piston 36 upwardly in cylinder 35 until the auxiliary piston 55 has fully settled to its Fig. 3 position. Consequently, there is only an infinitesimal amount of resettling of the integrating piston 36 during interrupter operations prior to lockout and this resettling is due only to inherent leakage. When valve disc 71 is unseated, however, integrating piston resettles to its Fig. 2 position with great speed.

Recapitulating the operational mode of the interrupter, it will be recalled that magnetic plunger 7 descends a plurality of times in response to magnetic coil 5 being traversed by overload current and at the same time pump piston 28 reciprocates and delivers fluid underneath integrating piston 36 which advances upwardly in steps. After a predetermined number of opening and closing operations, usually four, stem 38 of integrating piston 36 strikes trip latch 39 and causes the toggle links 41, 42 to break and the interrupter to lock out. Simultaneously, as shown in Fig. 3, magnetic plunger 7 and pump piston 28 move to their lowermost positions.

If the interrupter operates less than four times, in response to transient surges, for example, integrating piston 36 advances to a position intermediate those illustrated in Figs. 2 and 3, respectively, and thereafter resettles at a relatively slow rate governed principally by leakage. During operations prior to lockout, auxiliary piston 55 is always returned to its uppermost position as illustrated in Fig. 2 by the lifting action exerted on it through the agency of pump piston 28. Hence, relief valve disc 71 is not unseated prior to lockout.

When lockout occurs, it is often desirable that the integrating piston 36 quickly recede from trip latch 39 so that the interrupter can execute its full number of operations without locking out prematurely after being reset. For this reason, auxiliary piston 55 is adapted to move downwardly after a short time delay and to depress valve stem 66. Upon this event, disc 71 is forced downwardly in opposition to spring 67 and fluid may then flow freely from cumulative cylinder 35 through hole 75, passageway 76, and out into the ambient fluid through discharge orifice 77. This permits the quick descent of integrating piston 36 and achieves the desired result. If manual or automatic resetting of the interrupter is now brought about by rotating main operating shaft 25 through manual means or some external agent, integrating piston stem 38 will have descended an appreciable distance from trip latch 39 and therefore the latter will not be tripped again until the integrating piston stem 38 has again been elevated by receiving fluid from pump 28. During resetting of the interrupter, auxiliary piston 55 is picked up by pump piston 28 engaging flange 63. This creates a partial vacuum in auxiliary piston cylinder 62 that causes upper disc valve 61 to unseat and thereby open orifice 60 for allowing ingress of fluid under the auxiliary piston 55 so that the latter offers no restraint against pump piston 28.

Although only a preferred embodiment of the invention has been illustrated and described in connection with one particular type of circuit interrupter, the disclosure is not to be interpreted as limiting the scope of the invention for it may be variously embodied and it is to be construed in harmony with the claims which follow.

It is claimed:

1. A repeating circuit interrupter comprising switch means, switch operating means responsive to occurrence of an overload, switch lockout means adapted to render said operating means ineffective after a predetermined number of switch operations, pump means operatively coupled to the operating means and including a pump piston adapted to stroke between initial and final positions and to remain in final position during lockout, a dashpot cylinder having an integrating piston therein advanceable to intermediate slow resetting positions when less than said predetermined number of operations are executed and to a lockout position, a relief valve means for controlling the fluid in said dashpot, said relief valve preventing discharge from the dashpot when said integrating piston is in any intermediate position, a hydraulic resettling piston adjacent said pump piston and including a spring for urging the resettling piston from initial to final position at a velocity lower than that of the pump piston, said resettling piston having a portion extending into the path of said pump piston whereby said pump and resettling pistons jointly return to initial position prior to lockout, said pump piston when in final lockout position allowing said resettling piston to open said valve and permit quick return of said lockout piston to initial position.

2. A repeating circuit interrupter comprising switch means, switch operating means responsive to occurrence of an overload, switch lockout means adapted to render said operating means ineffective after a predetermined number of closely successive switch operations, pump means operatively coupled to the operating means and including a pump piston adapted to stroke between initial and final position and to remain in final position during lockout, a dashpot cylinder having a relief orifice and an integrating piston therein advanceable in steps to lockout means operating position, valve stem means biased in one direction and a valve member operated thereby for controlling said relief orifice, a hydraulic resettling piston adjacent said pump piston and valve stem and including a portion in lost motion connection with the pump piston and valve stem, spring means biasing said resettling piston toward valve operating position at a velocity lower than that of the pump piston, whereupon said valve stem is actuated when said pump piston is in its final position during lockout and said integrating piston may thereby quickly return to initial position.

3. A repeating circuit interrupter comprising switch means, switch operating means for actuating the switch means from closed to open position upon occurrence of an overload, switch reclosing means, a dashpot cylinder having an integrating piston therein, pump means operatively coupled to the switch operating means, said pump means being movable between initial and final position of its stroke to displace fluid into said dashpot and move said integrating piston in steps terminating in lockout position, switch lockout means actuable by said integrating piston when in lockout position to render said switch reclosing means ineffective and to urge said pump means into final position, relief valve means controlling the fluid in said dashpot cylinder, a spring biased resettling piston means in lost motion connection with the pump means and adapted to move between initial and final positions at lower velocity than the pump means, said resettling piston when in final position being adapted to open said relief valve means for allowing discharge from the dashpot cylinder and rapid resettling of said integrating piston.

4. A repeating circuit interrupter comprising switch means, overload responsive switch operating means, lockout means adapted to render said operating means ineffective following a predetermined number of closely successive switch operations, dashpot means having an integrating piston advanceable in steps terminating in operation of said lockout means, a hydraulic pump piston adapted to stroke between initial and final positions and deliver a quantity of fluid to said cylinder for advancing said integrating piston in response to each switch operation, said pump piston stopping in final position at the end of its predetermined number of operations, relief valve means controlling the fluid in said dashpot cylinder, yieldable means in lost motion connection with said pump piston and movable at a slower rate between positions corresponding with those of the pump piston, said yieldable means when in final position being adapted to actuate said relief valve means whereby said integrating piston may rapidly resettle to a position where it is ineffective to operate the lockout means.

5. A repeating circuit interrupter comprising switch means, overload responsive switch operating means, lockout means adapted to render said operating means ineffective following a predetermined number of closely successive switch operations, a hydraulic pump driven by the switch operating means, each stroke of said pump delivering a measured quantity of fluid, cylinder means receiving said fluid and including integrating means advanceable in steps terminating in operation of the lockout means, relief valve means controlling the fluid in said dashpot, a biased time delay piston means in lost motion connection with the pump piston and restrained in starting position thereby when the pump piston is at one end of its stroke, said time delay piston being releasable to actuate said relief valve means and allow quick resettling of said integrating means when said pump remains at the other end of its stroke for an extended period.

6. A repeating circuit interrupter comprising switch means, switch operating means operatively connected with the switch means for moving the latter from closed to open position upon occurrence of an overload, switch reclosing means, lockout means adapted to render said reclosing means ineffective following a predetermined number of closely successive switch openings, dashpot cylinder means including integrating means advanceable in steps terminating in operation of the lockout means, relief valve means controlling fluid in said dashpot cylinder means, and normally ineffective time delayed valve opening means adapted to open said valve means a predetermined time after lockout whereupon said integrating means may rapidly resettle to a position where it is ineffective to operate the lockout means.

7. A repeating circuit interrupter comprising switch means, overload responsive switch operating means for effecting opening of said switch means upon occurrence of each overload in a closely successive series of overloads and including switch reclosing means, lockout means, integrating means operatively connected with the switch operating means and including a piston means adapted for advancement in steps in correspondence with switch operations, said lockout means being actuated only by the final step of said piston means and adapted to thereafter prevent operation of said switch operating means, valve means controlling fluid under said piston means, and means responsive to the final step of said piston means to open said valve means for discharging fluid from under the piston means whereupon the latter may resettle rapidly following lockout of said switch means.

References Cited in the file of this patent

UNITED STATES PATENTS

| 1,805,082 | Edsall | May 12, 1931 |
| 1,823,668 | Shelledy | Sept. 15, 1931 |
| 2,710,895 | Fredrickson | June 14, 1955 |

UNITED STATES PATENT OFFICE
CERTIFICATE OF CORRECTION

Patent No. 2,860,205

November 11, 1958

Edmund J. Stramowski

It is hereby certified that error appears in the printed specification of the above numbered patent requiring correction and that the said Letters Patent should read as corrected below.

Column 6, line 73, after the word "slow" strike out "resetting" and insert instead -- resettling --.

Signed and sealed this 24th day of February 1959.

(SEAL)
Attest:

KARL H. AXLINE
Attesting Officer

ROBERT C. WATSON
Commissioner of Patents